March 18, 1924.

W. SIERAKOWSKI

MINCED HAM AND SAUSAGE BLADDER HOLDER

Filed Sept. 23, 1922

1,487,484

INVENTOR.
Walter Sierakowski
BY George C. Heinitz
ATTORNEY.

Patented Mar. 18, 1924.

1,487,484

UNITED STATES PATENT OFFICE.

WALTER SIERAKOWSKI, OF LANSING, MICHIGAN.

MINCED-HAM AND SAUSAGE BLADDER HOLDER.

Application filed September 23, 1922. Serial No. 590,123.

*To all whom it may concern:*

Be it known that I, WALTER SIERAKOWSKI, a citizen of Poland, residing at Lansing, county of Ingham, and State of Michigan, have invented certain new and useful Improvements in Minced-Ham and Sausage Bladder Holders, of which the following is a specification.

The present invention relates to a holder for the convenient handling of minced ham and sausage bladders or like articles of food in packing houses, cold storage houses, etc., and it is the principal object of my invention to do away with the provision of strings or other customary means of suspending the articles which are apt to make the goods unsightly and their handling unsanitary.

A further object of my invention is to provide a holder of simple and inexpensive construction by means of which the minced ham and sausage bladders may be quickly and conveniently gripped and handled without the use of the hands in order to avoid the danger of contamination during the frequent handling of the goods.

Another object of the invention is the provision of a holder which allows a ready and automatic adjustment to any size of article to be handled.

A still further object of the invention is the provision of a holder which will securely grip and hold the article during its suspension.

Finally the invention has for its object the provision of a holder allowing a convenient relative and permanent adjustment of the two gripping arms.

These and other like objects and advantages of my invention will become more fully known as the description thereof proceeds and will then be more specifically pointed out in the appended claim.

In the accompanying drawings forming a material part of this disclosure:

Figures 1, 2:
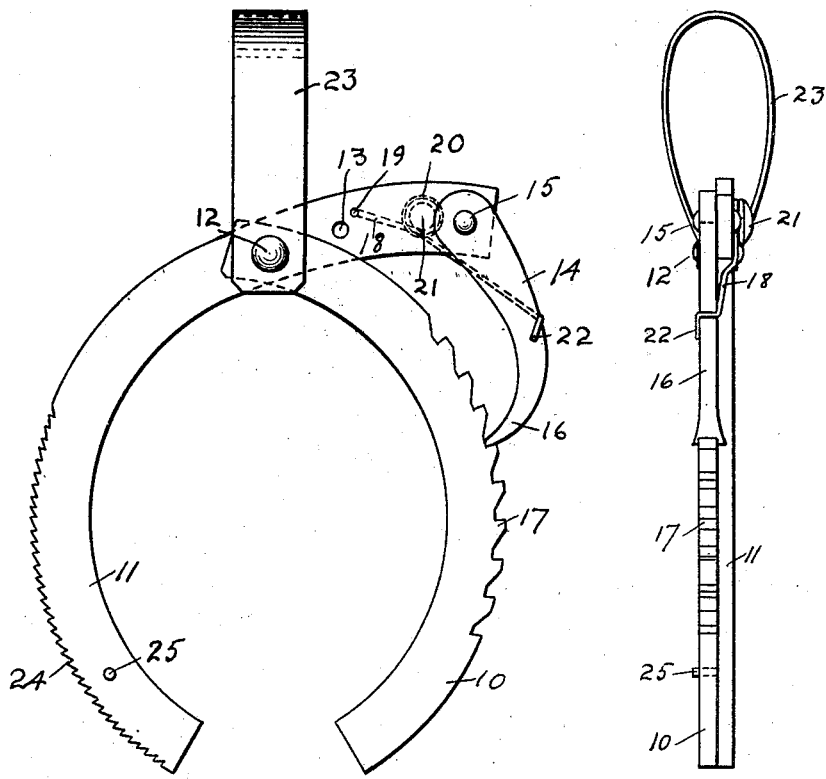
Figure 1 is a front view of a holder constructed according to the present invention.
Figure 2 is an end view thereof.
Figure 3:
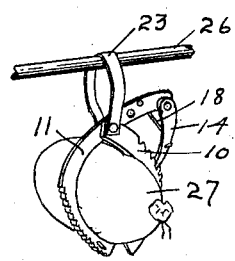
Figure 3 is a perspective view of my device on a reduced scale in its working position.

The device or holder comprises a pair of gripping members 10 and 11, the member 10 of which is pivotally and removably connected to the member 11 intermediate its ends as at 12. The member 11 is provided with a suitable opening 13 beyond the pivot point allowing an adjustment of the relative positions of both members.

To the outer end of member 11 a pawl 14 is pivotally secured as at 15, having its free end shaped into a hook 16 adapted to engage a rack part 17 formed on the outer edge of member 10.

A spring 18 secured with one end, as at 19 in the outer face of member 11 is formed intermediate its ends into a loop 20 encircling the shank of a button 21 on the outer face of member 11, while the other end of the spring is guided over the outer face of pawl 14 and is shaped at its extremity into a finger 22 gripping over the edge of the pawl and its inner face.

To the pivot point 12, is secured the lower end of a loop handle 23, and the outer edge of member 11 is toothed, as indicated at 24 in order to give the holder a firm hold on a supporting surface when a ham etc. is introduced between both gripping members 10 and 11. A stop pin 25 is arranged in the front face of member 11 at the lower part thereof.

If it is desired to suspend a number of minced ham and sausage bladders or other articles of animalic food from a rod 26, the handle 23 is slid over the rod 26 and the minced ham and sausage bladder 27 which has been previously introduced between both members 10 and 11 will be securely suspended from said rod and held between the members 10 and 11 by means of the engagement of the pawl end 16 with the teeth 17 of member 10.

It will be clear that changes may be made in the general arrangement and in the construction of the minor details of my invention without deviating from the scope and spirit thereof.

Having thus described my invention, what I claim as new and desire to protect by Letters Patent of the United States is—

A holder of the class described, comprising flat gripping members connected for pivotal movement and together presenting a rounded adjustable gripping edge, a hanging member carried by the pivotal support of the gripping members, one of said members being extended beyond the pivotal support in a direction opposite its gripping edge and terminally provided with a pawl, the other of said members being formed on the edge remote from its gripping edge with a series of teeth with which said pawl cooperates, the pawl acting to automatically lock the gripping members in gripping relation to each other as the gripping area therebetween is reduced.

In testimony whereof I have affixed my signature.

WALTER SIERAKOWSKI.